March 16, 1971  D. K. McCARY ET AL  3,570,231
APPARATUS FOR HARVESTING PEANUTS OR LIKE CROPS
Filed Oct. 4, 1968  4 Sheets-Sheet 1

Dwana K. McCary &
Robert E. McCary
INVENTORS

BY
Browning, Ayer, Liddensoatt
& Thompson
ATTORNEYS

Dwana K. McCary &
Robert E. McCary
INVENTORS

ATTORNEYS

Dwana K. McCary &
Robert E. McCary
INVENTORS

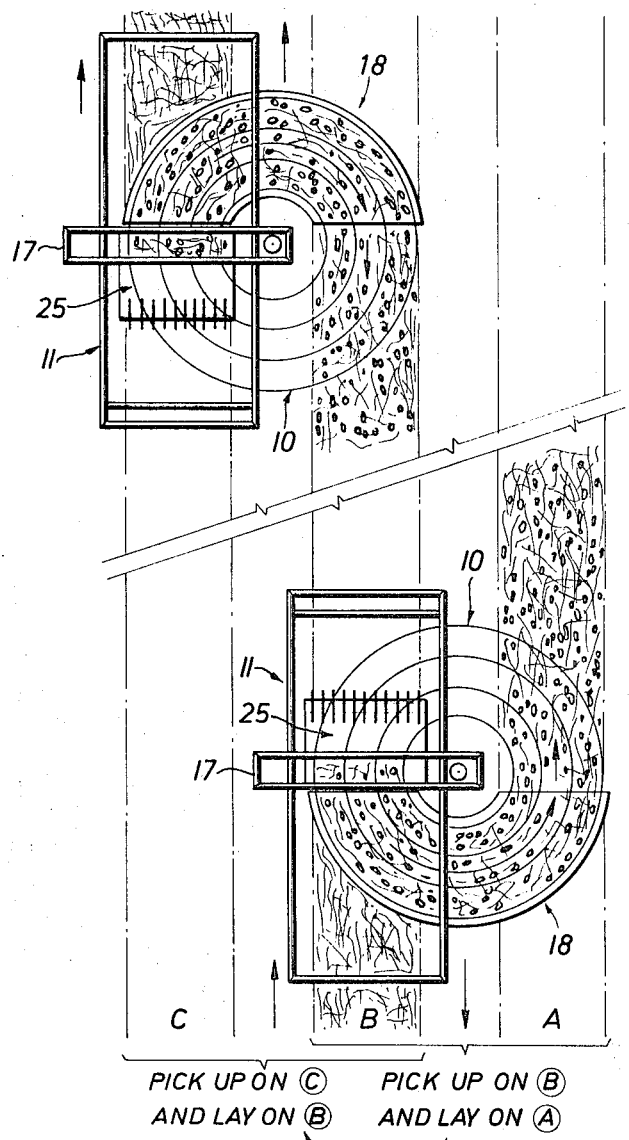
FIG. 8
FIG. 7
PICK UP ON C  PICK UP ON B
AND LAY ON B  AND LAY ON A
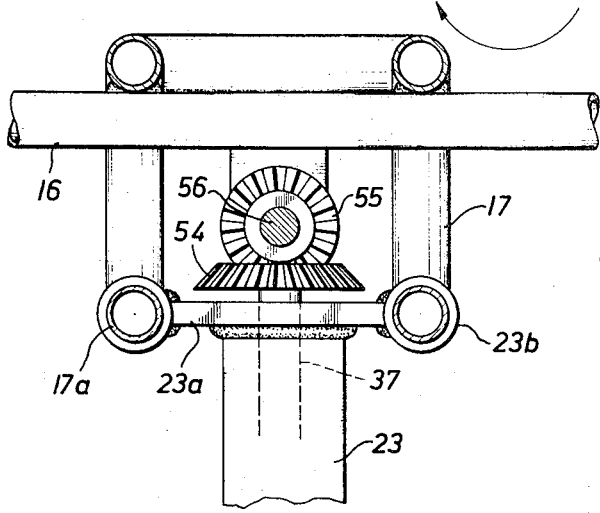
FIG. 9
Dwana K. McCary &
Robert E. McCary
INVENTORS
BY
ATTORNEYS 3,570,231
APPARATUS FOR HARVESTING PEANUTS
OR LIKE CROPS
Dwana K. McCary and Robert E. McCary, both of
P.O. Box 350, Dilley, Tex. 78017
Filed Oct. 4, 1968, Ser. No. 765,108
Int. Cl. A01d 79/00
U.S. Cl. 56—370                                    13 Claims

ABSTRACT OF THE DISCLOSURE

An apparatus for inverting a windrow comprises a frame adapted to be moved forwardly over the windrow, fingers mounted on the frame for rotation about a laterally extending axis for penetrating the top of the windrow, and a plate mounted on the frame rearwardly of the fingers and in the path of the windrow to confine it for turning on itself about a generally horizontal axis. A platform on the frame is open at both sides of its rearward end and has one side positioned to receive the inverted windrow. A wheel is mounted on the platform for rotation about a generally horizontal axis midway between the sides of the platfom, and parts on the wheel penetrate the top of the inverted windrow received on the one side of the platform to carry it to and off the other open side of the platform and thus lay the inverted windrow on the ground surface to one side of the ground surface from which it was picked up. A forward wall on the platform extends across it from one side to the other and is curved concavely with respect to the rearward end of the platform and concentrically outwardly of the windrow penetrating parts on the wheel. The means for picking up and inverting the windrow is fixed in alignment with the frame, and the platform is laterally shiftable of the frame so as to dispose a selected side in position to receive the inverted row and to cause its other side to overhang the frame. Each of the pick-up fingers and wheel is operated independently of the forward movement of the frame, and there is a means on the frame for building up a mound of soil along the ground surface from which the windrow has been picked up.

This invention relates in general to apparatus for harvesting peanuts or like crops. More particularly, it relates to improvements in apparatus for inventing a windrow of such a crop.

Peanuts are planted in rows and grow beneath the ground surface on the lower ends of thickly matted vines. During harvesting, the vines are cut between adjacent rows or every other row, and the vines and peanuts are laid up as windrows by means of a blade which is pulled through the soil just beneath the peanuts. In this manner, the peanuts are permitted to dry a desired amount in the field and before being separated from the vines in a combine.

It is also the practice in harvesting peanuts to agitate them sufficiently to shake much of the soil loose from the shells before the windrow is picked up by the combine. Obviously the soil is more readily loosened from the shell when it is relatively dry. On the other hand, if the windrow is too dry, the peanuts may be shaken loose from the vines during agitation, in which case they would fall to the ground and not be picked up by the combine.

Several types of apparatus are available for so preparing a windrow of peanuts and vines for the combine. In one such apparatus, an upwardly and rearwardly extending endless chain is disposed rearwardly of the blade. During forward movement of this apparatus, the chain picks up the windrow, carries it over the upper end of the chain where it is dropped off and laid down over the ground surface from which it was picked up. Although this agitates the windrow, it does not remove much soil from the peanuts because they are not dry. Therefore, it is often the practice to permit the windrow to lie in the sun for a period of time, and then agitate it again, preferably with the same apparatus, but with the blade removed from it.

Of course, the peanut shells will dry much faster and more thoroughly if the windrow is inverted so that the peanuts are on top of the vines while the windrow lies in the field. Also, if there is water standing in the rows, or if it should rain as the windrow lies in the field, the peanuts may be immersed in the water unless they are on top of the windrow. Therefore, apparatus has been provided for the purpose of picking up and inverting the windrow.

However, difficulty has been encountered in picking up a windrow with this latter type of apparatus, presumably due to the fact that the vines have become more firmly compacted and more tightly interwoven as a result of their agitation. In any case, as a practical matter, this inverting apparatus is used only in a one step process— i.e., the peanuts and vines are severed from the soil and laid up as an inverted windrow during a single pass. Consequently, the peanuts are agitated, prior to being picked up by the combine, only while relatively damp.

Known apparatus for inverting windrows of peanuts is also objectionable from other standpoints. Thus, there is a tendency for the vines to become clogged in one type, thereby necessitating a slow down in the harvesting operation. This is true even though they are not first laid up as windrows, and thus relatively uncompacted and free from interweaving. Other types of such apparatus are suitable, if at all, only for certain sizes of peanuts and vines.

Kucera Pat. Nos. 2,390,375 and 2,391,527 show apparatus for inverting a windrow of hemp or the like by sequentially picking it up from the ground surface, turning it around, inverting it, and laying the inverted windrow to one side of the ground surface from which it was picked up. Although such apparatus might enable windrows of matted vines to be handled without excessive clogging, it is particularly unsuited in other respects for picking up and inverting crops such as peanuts in which the nut is on the bottom of the windrow prior to inversion. That is, fingers movable along an endless chain for penetrating the bottom of the windrow would tend to pull the peanuts loose from the vines, particularly at the upper end of the chain where the fingers would pull through the vines. Furthermore, the peanuts of a windrow picked up by such apparatus would be dragged over a platform during movement from the one side onto which the windrow is lifted by the pick-up mechanism to and off the opposite side of the platform, and this would also tend to separate the peanuts from the vines.

Furthermore, in the use of the apparatus of the Kucera patents to windrow hemp or any other crop, it would be necessary to either traverse each row from the same end of the field or traverse every other row, which would require that the field be covered twice. Still further, in the event the apparatus were to be used in simultaneously inverting two or more planted rows of crops having a furrow between them, as may be desirable in the case of peanuts, the middle of the inverted rows would be laid down in a furrow. In the event of water in the furrow, this could permit peanuts on the inverted windrows to sag into the water.

An object of this invention is to provide apparatus which is suitable for inverting windrows of peanuts or like crops after the windrows have been laid up on the ground surface and dried a desired extent.

A more particular object is to provide such apparatus which may be used in inverting the windrow even though the vines are tightly compacted and thoroughly interwoven.

Another object is to provide apparatus which is suitable for use in inverting windrows of peanuts and vines of different sizes.

Yet another object is to provide apparatus for picking up a windrow, inverting it, and laying the inverted windrow to one side of the ground surface from which it was picked up without undue separation of the peanuts from the vines.

A further object is to provide apparatus for picking up a window, inverting it, and laying the inverted windrow to such one side during each pass or traverse of adjacent rows in the field.

Still another object is to provide such apparatus for picking up a windrow, inverting it, and laying the inverted windrow on a sufficiently high level of the ground surface to one side of that from which the windrow was picked up as to keep it above water which may lie in the field.

Still a further object is to provide such apparatus in which portions of the windrow which may become clogged in apparatus may be easily and quickly cleared out.

Yet a further object is to provide apparatus of the character described in one or more of the foregoing objects which is simple and inexpensive to construct and maintain and easy to operate at relatively high speeds.

These and other objects are accomplished, in accordance with the illustrated embodiment of the invention, by apparatus which comprises a frame adapted to be moved forwardly over a windrow, means on the frame for picking up and inverting the windrow for movement in a forward direction, and additional means on the frame for turning the inverted windrow to move in a rearward direction and laying it on the ground surface in its inverted position and to one side of the ground surface from which it was picked up. More particularly, the means for picking up and inverting the windrow includes fingers rotatable about a laterally extending axis for penetrating the top of the windrow, and a plate disposed rearwardly of the fingers and in the path of the windrow to confine the windrow for turning on itself about a generally horizontal axis so as to move in a rearward direction.

The additional means for turning and laying the inverted windrow to one side comprises a platform which is open to the rear at each side with one such side positioned to receive the inverted row, and means on the platform for carrying the inverted windrow received on the one side thereof to and past the other side thereof. More particularly, a forward wall extending across the platform from one side to the other is curved concavely with respect to the rearward end of the platform, and a wheel is mounted on the platform to rotate about a generally vertical axis midway between the sides of the platform and has parts on it for penetrationg the top of the inverted windrow to carry it from the one to the other side thereof.

I have found that the windrow will seldom clog up in such apparatus, even though its vines are tightly compacted and interwoven as a result of having been windrowed with conventional apparatus of the type described. Consequently, the use of my apparatus enables the windrow to be laid up to dry to at least some extent before being inverted, so that the agitation which takes place during inversion is more effective in separating soil from the shells. I have also found that since only the top of the windrow above the peanuts are penetrated by the fingers of the pick-up mechanism, and further since the peanuts are on top of the windrow as it is moved across the platform, there is very little tendency to separate the peanuts from the vines, even though dried to some extent.

In its preferred form, the apparatus of this invention may be operated to lay the inverted row on the ground selectively to either side of the surface from which the windrow was picked up. Thus, for example, after using the apparatus to pick up a windrow and lay it to one side thereof, the operator may shift the platform to its alternate position, so that upon movement of the apparatus in the opposite direction and over a second windrow, it will lay the second windrow over the uncovered row. For this purpose, the platform and the means for picking up and inverting the windrow are laterally shiftable relative to one another to dispose one side or the other of the platform in position to receive the inverted windrow. More particularly, the pick-up mechanism is fixedly secured in alignment with the frame, and the platform is laterally shiftable with respect to the frame between the positions described.

In another preferred embodiment of the invention, a means is provided for operating each of the pick up and inverting means and the means for turning and laying the inverted windrow on the ground surface independently of the forward movement of the frame. In this manner, each such means may be operated to remove clogged portions of the windrow while the frame is stationary, and thus without accumulation of further portions of the windrow which may cause further clogging. In the illustrated embodiment of the invention, the frame is pulled by a tractor, and the operating means is connectible to a power take-off on the tractor.

In still another preferred embodiment of the invention, there is a means on the frame for building up a mound of soil along the ground surface from which the windrow has been picked up. In the illustrated embodiment, this comprises discs carried behind each side of the means for picking up and inverting the windrow so that the mound is built up generally along a mid-portion of the traversed row. Thus, when the traversed row comprises two planted rows of peanuts having a furrow therebetween, the furrow will be covered with the mound. Thus, as the apparatus is moved in an opposite direction in a subsequent traverse over an adjacent row, the peanuts of the inverted windrow which is laid on the uncovered row will be on a high portion of the ground and thus out of water which might otherwise accumulate in the furrow.

In the drawings, wherein like reference characters are used to designate like parts:

FIG. 7 is a top plan view of the apparatus, on a reduced scale and during movement in a direction indicated by the arrow for picking up a windrow from row B and laying it down in inverted position on row A;

Figure 3:
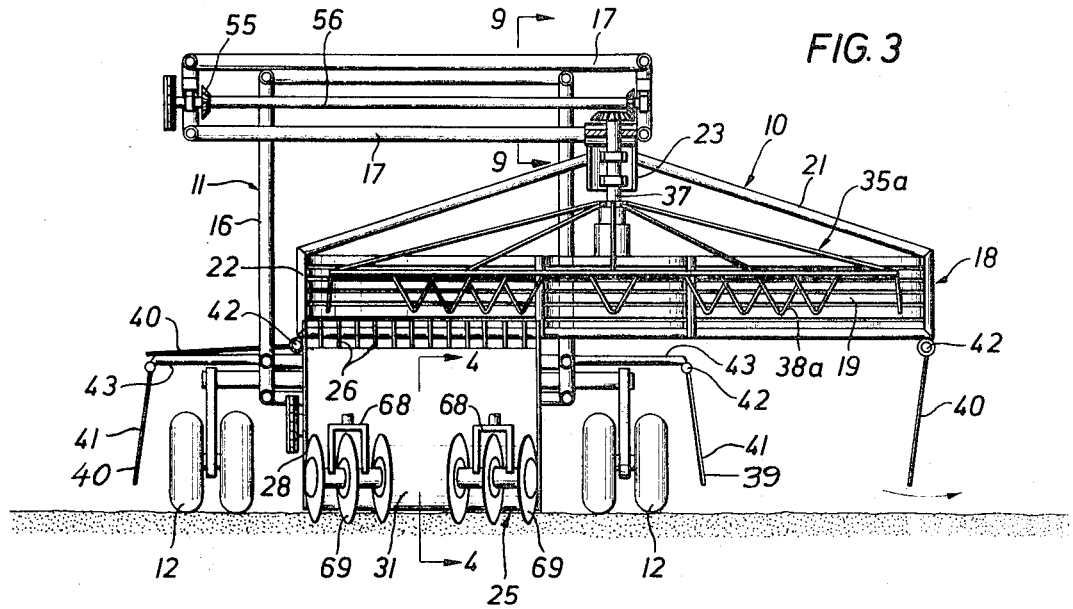
FIG. 3 is a vertical sectional view of the apparatus, as seen along broken line 3—3 of FIG. 1.

FIG. 8 is a view similar to FIG. 7, but showing the apparatus after completion of the traverse of row B illustrated in FIG. 7 and upon turning around to move in an opposite direction over row C to pick up a windrow therefrom lay it down in an inverted position on row B; and FIG. 9 is an enlarged detailed view of the interengagement of drive parts on the frame and platform, as seen along broken line 9—9 of FIG. 3.

With reference now to the details of the above described drawings, the overall apparatus, which is indicated in its entirety by reference character 10, includes a frame 11 of rectangular shape which is supported for movement over the ground surface G by means of wheels 12 outboard of each side of the frame. A hitch 13 on the front end of the frame is attachable to a tractor or the like, the rear wheels of which are indicated by the broken lines 14 of FIG. 1, whereby the frame may be moved forwardly (to the left in FIGS. 1 and 2, to the right in FIG. 6, downwardly in FIG. 7, and upwardly in FIG. 8).

Figures 1, 2:
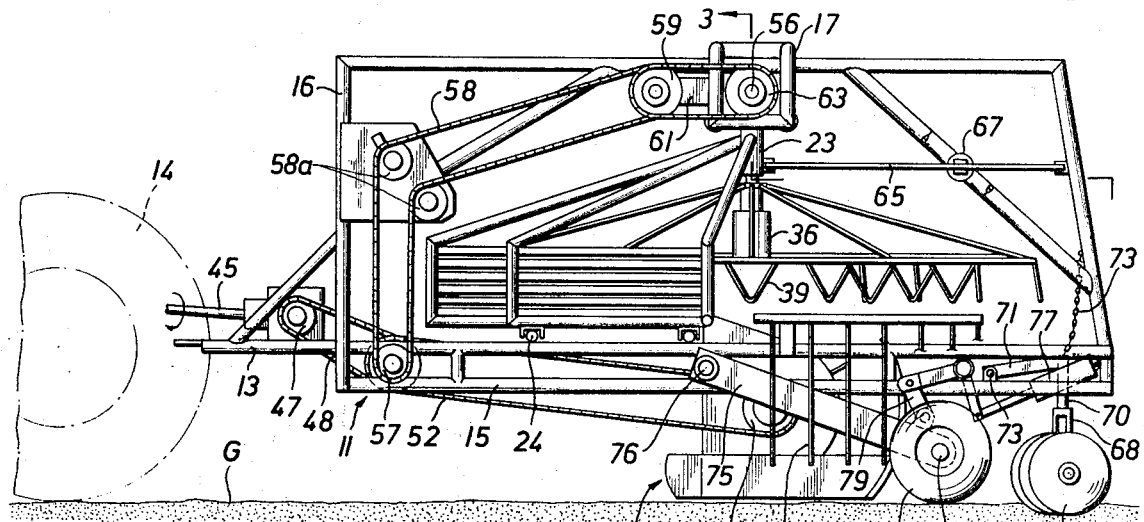
FIG. 1 is an elevational view of the left side of the apparatus.
FIG. 2 is a top plan view of the apparatus of FIG. 1, with the platform and carrier thereabove shifted relative to the frame for overhanging the right side of the frame.

The frame 11 includes a base 15 and an open superstructure 16 above the base. An open, box-like subframe 17 extends laterally across a mid-portion of the superstructure 16 and overhangs the superstructure at opposite sides, as shown in FIGS. 2 and 3 and for a purpose to be described below.

A platform 18 is mounted above the forward portion of base 15 of the frame 11. More particularly, and as previously described, this platform which is approximately twice the width of the base 15 of the frame 11, is laterally shiftable with respect to the frame between positions in which one side is generally aligned with the frame and the other side overhangs the frame. Thus, as shown in each of FIGS. 1 to 3, 5, 6 and 8, the left side of the platform is aligned with the frame 11, while the right hand side thereof overhangs the right side of the frame; and, as shown in FIG. 7, the platform has been shifted so that its right side is aligned with the frame and its left side overhangs the left side of the frame.

As can be seen from the drawings, the rear end of the platform is open at both sides, so that, as previously described, an inverted windrow will be received on the side aligned with the frame and moved to and off the side thereof overhanging the frame. Thus, the inverted windrow is laid on the ground surface adjacent the surface over which the frame is moved and thus from which the windrow has been picked up. More particularly, the floor 20 of the platform is of semicircular shape with the diametrical portion thereof disposed on its rearward open side, and a wall 19 is mounted on the forward arcuate edge of the platform with its concave face or side facing the rear and arranged concentrically of the platform floor.

The platform is supported above the base 15 of the frame by means of radial spokes 21 which connect uprights 22 about the wall with a hub 23. The hub is in turn supported for movement laterally over the subframe 17 by means of a plate 23a extending between sleeves 23b which are guidably slidable over the lower laterally extending rods 17a of the frame 17 (see FIG. 9). Rails 24 mounted beneath the floor of the platform facilitate its sliding over the top surface of the base 15 of the frame.

Figure 4:
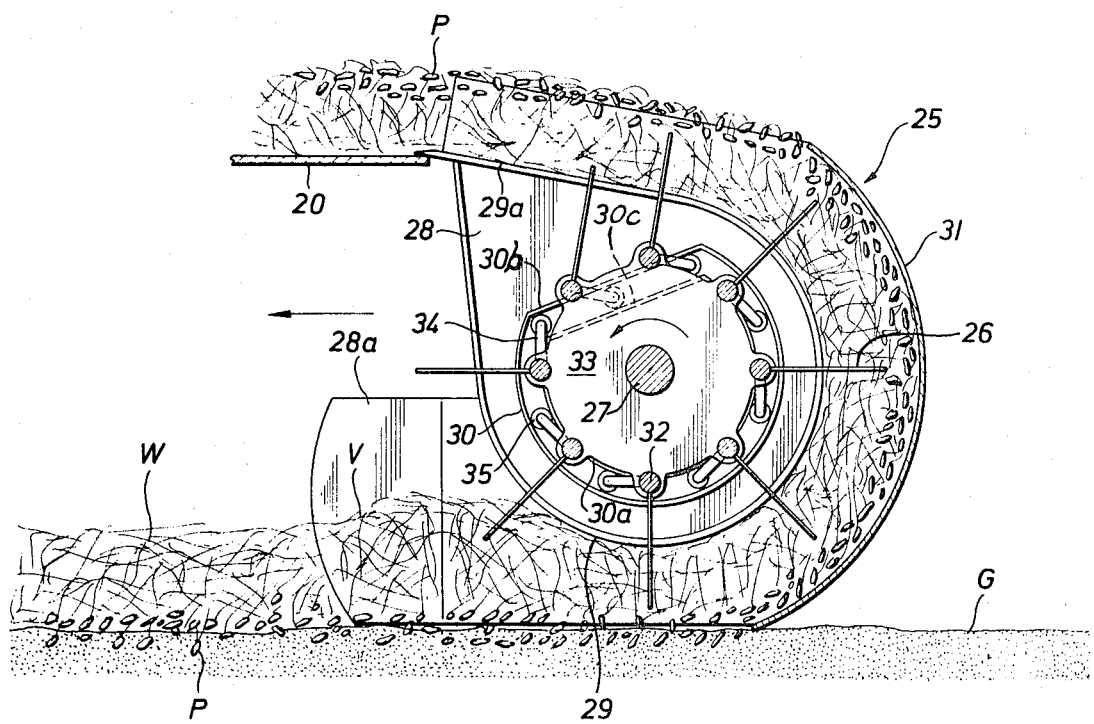
FIG. 4 is an enlarged sectional view of the mechanism for picking up, inverting, and feeding the inverted windrow onto an open side of the platform, as seen along line 4—4 of FIG. 3.
Figure 5:
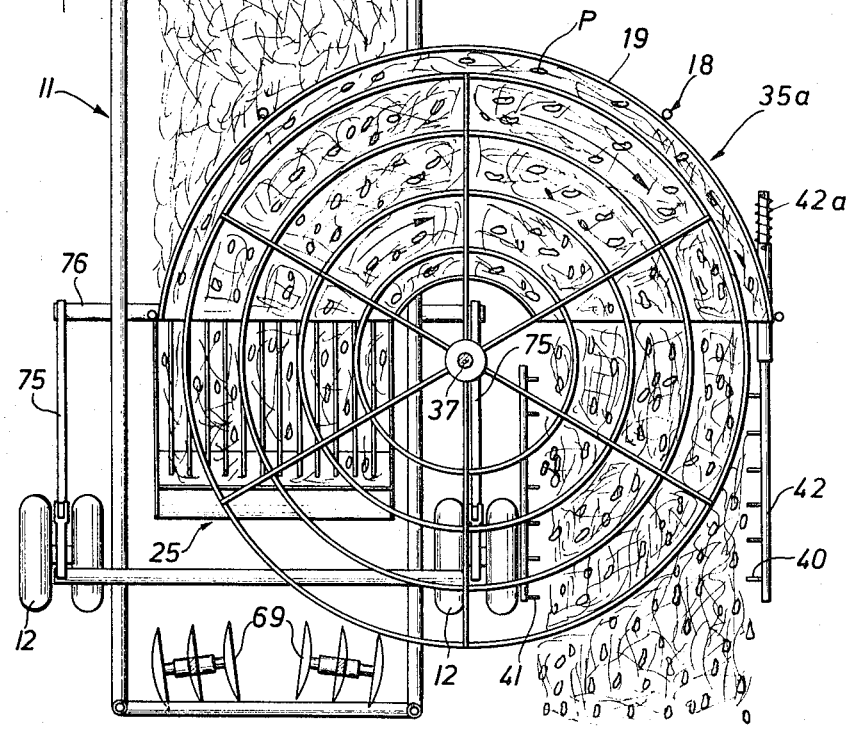
FIG. 5 is a horizontal sectional view of the apparatus, as seen along broken line 5—5 of FIG. 6, and illustrating the movement of a windrow as it is picked up from the row over which the frame is moved, inverted, and laid down on an adjacent row.

The mechanism 25 for picking up and inverting the windrow to move it in a forward direction onto the aligned open side of the platform includes a plurality of fingers 26 rotatable about a laterally extending shaft 27 in the direction indicated by the arrow in FIG. 4. More particularly, the shaft 27 is journaled at its opposite ends by the side walls of a housing 28 mounted between the sides of the frame and in substantial longitudinal alignment therewith. Walls 28a along each side wall of the housing have forward ends which flare outwardly to guide the windrow into the housing.

As shown in FIG. 4, the axis of the shaft 27 is arranged between the floor 20 of the platform and the ground surface G so that the fingers on it penetrate the top of the windrow W over which the frame is moved. More particularly, this axis is spaced rearwardly of the open side of the platform a distance approximately equal to the radius of the path defined by the outer ends of the fingers 26, so that the inverted row will be fed smoothly onto the open side of the platform. As also best shown in FIG. 4, these fingers 26 extend through slots within a casing 29 of the housing which surrounds an outer drum 30 containing means to be described for controlling the movement of the fingers during rotation of the shaft 27. As shown in FIG. 4, the casing 29 is circular in cross-section except for its upper forward quarter and has an upper wall 29a which connects the upper rearward quarter with the floor 20 of the platform.

An arcuate plate 31 also extends between the side walls of the housing rearwardly of the fingers 26 and concentrically of the shaft 27 so as to confine the windrow W penetrated by the fingers for movement in the arcuate path illustrated in FIG. 4. More particularly, the plate 31 curves from its lower end adjacent the ground surface G to its upper end generally above such lower edge so that as the frame is moved forwardly over the windrow and the fingers 26 are rotated in the direction indicated in FIG. 4, such fingers will penetrate the top of the windrow and move it rearwardly toward the plate and then over the curved side of the plate to turn the windrow upon itself and feed it into the floor 20 of the platform.

As also shown in FIG. 4, each of the fingers 26 is carried on a pin 32 mounted on the periphery of an inner drum 33 rotatable with the shaft 27 concentrically within the outer drum 30. An arm 34 is rigidly secured to each pin 32 and extends at a right angle thereto, and a roller 35 on each arm is guided for movement between the inside of drum 30 and a concentric surface 30a therein during rotation of the shaft 27. Since the axis of the shaft 27 and the curved portions of the casing 29 and plate 31 are concentric, the fingers 26 will penetrate the vines of the windrow to a fixed depth as the windrow W is picked up at the bottom of a traverse of the fingers and moved through substantially 180° to the top of the traverse of the fingers adjacent the wall 29a.

However, as shown in FIG. 4, the drum 30 and surface 30a have upper flattened portions 30b and 30c which guide the rollers 35, and thus the fingers 26, during the portion of their traverse following the top traverse. More particularly, and as illustrated in FIG. 4, the fingers are caused to move inwardly with respect to the wall 29a of the casing in a direction perpendicular thereto. Consequently, there is no tendency for the fingers to tear through the vines as they are withdrawn into the casing.

The shaft 27 is rotated at such a speed that the linear velocity of the portions of the fingers 26 which penetrate the windrow is greater than the ground speed of the frame. Thus, the fingers will pick up and invert the windrow without causing any clogging at the entrance to the lower edge of the plate 31. More particularly, and as will be described to follow, this rotation of the shaft 27 is independent of the forward movement of the frame, so that in the event there is any clogging at the entrance to the mechanism 25, the frame may be stopped and the rotation of the fingers 26 continued so as to clear out the portion of the windrow which is clogging the mechanism 25.

As the inverted windrow is received onto the open side of the platform aligned with the frame, it is engaged by a carrier in the form of a wheel 35a rotatably mounted above the floor 20 of the platform and turned with the wheel through 180° so as to move in a rearwardly direction and off the open end of the platform to one side of the frame. As shown in the drawings, the wheel 35a comprises a hub 36 rotatable on a shaft 37 which extends upwardly through and is journaled in the hub 23 (see FIG. 9) on which the spokes 21 of the platform are mounted. Radial spokes 37a extend from the hub to support concentric rings 38 of the wheel which are disposed in a generally horizontal plane above the floor 20 of the platform. More particularly, V-shaped prongs 38a are mounted on and extend downwardly from the lower sides of the wings for movement over the platform relatively near to the floor 20. Thus, the prongs 38a will penetrate the inverted windrow as it is moved onto the platform and carry it in a 180° arc about the axis of the shaft 37. During such movement, the peanuts P of the inverted windrow W are on the upper surface thereof above the vines V so that they are not dragged over the floor 20 of the platform. Of course, the speed of rotation of the wheel is so related to the speed of rotation of the fingers 26 as to cause a substantially continuous flow of the inverted windrow onto and off of the platform.

Figure 6:
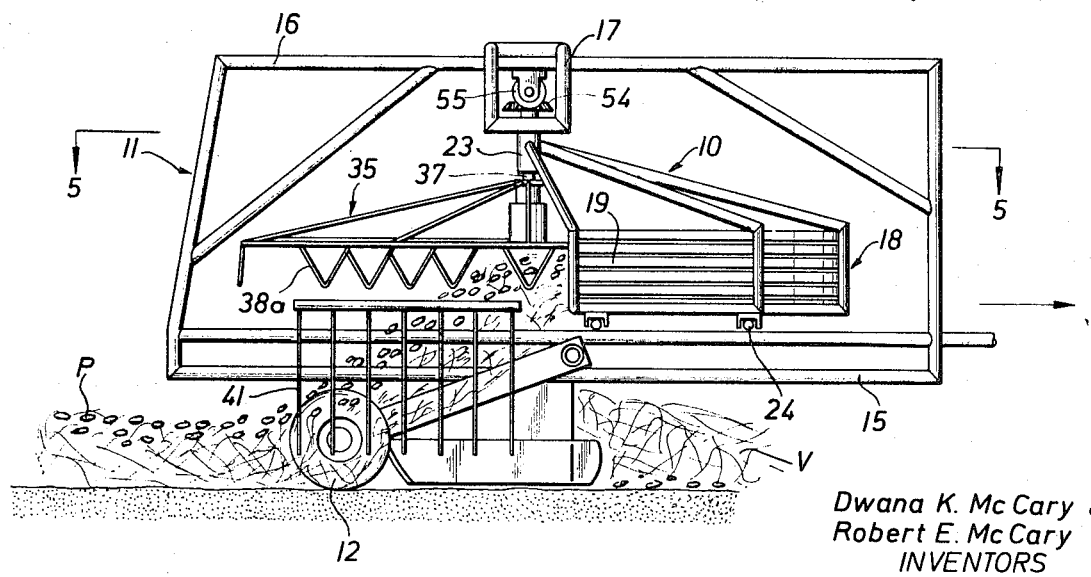
FIG. 6 is an elevational view of the apparatus, similar to FIG. 1 but from the right side thereof and showing the inverted windrow as it is moved off the overhanging open side of the platform and laid down on the adjacent row.

As best shown in FIG. 6, as the frame moves forwardly, the inverted windrow is moved by the carrier off the overhanging open end of the platform and onto the ground surface G in trailing relation to the frame. More particularly, as it leaves the platform, the windrow is confined at opposite sides by fenders 39 and 40 disposed rearwardly adjacent each side of the overhanging side of the platform. Each such fender is of more or less conventional construction comprising fingers 41 extending downwardly from a longitudinally extending rod 42, the fingers being spring pressed or otherwise urged (see spring 42a in FIG. 2) to inwardly tapering portions for guiding the windrow as it leaves the platform.

As best shown in FIG. 3, the rod 42 of the outboard fender 40 is supported on the outermost side of the platform 18, while the rod 42 of the inboard fender 39 is supported on the end of a lateral member 43 which extends outwardly from opposite sides of the base of the frame 11. The fenders 39 and 40 shown in FIGS. 1 to 3, are duplicated at the left side of the apparatus so as to be operatively disposed with respect to the frame and platform when the platform is shifted from the position of FIG. 3 to the position of FIG. 7. Thus, there is another fender 40 mounted on the other end of member 43 extending outwardly from the left side of the frame, as well as another fender 39 connected to the lower left hand corner of the platform 18. The spring 42a for each of the fenders 40 is adapted to yield to permit the fender to swing into a generally horizontally position above the frame member 43 when the side of the platform on which such member is mounted is aligned with the frame.

Each of the shafts 27 and 37 for driving the fingers 26 and the carrier 35, respectively, is rotated by means on the frame adapted to be connected with a power take-off of the tractor 14. Thus, as best shown in FIGS. 1 and 2, a driveshaft 45 adapted to connect with the power take-off extends into a gear box 46 mounted on the hitch 13, and sprocket 47 on the driven shaft of the gear box 46 is connected by a chain 48 to a sprocket 49 on a lateral shaft 50 rotatably mounted on a forward portion of the base 15 of the frame. Another sprocket 51 connected to the shaft 50 toward the left side of the frame, is connected by a chain 52 to a sprocket 53 connected to the shaft 27. Thus, as previously described, the fingers 26 rotatable with the shaft 27 are driven independently of the forward movement of the frame.

As best shown in FIG. 9, a spur gear 54 on the upper end of the rotating shaft 37 for the wheel 35a is engaged with a spur gear 55 rotatable on a shaft 56 extending laterally within and journaled at opposite ends from the subframe 17. This shaft 56 is also rotated from the power take-off of the tractor so that, similarly to the fingers 26, the wheel 35a is driven independently of the forward movement of the frame. Thus, as best shown in FIGS. 1 and 2, the shaft 50 extends beyond the outer side of the left side of base 15 of the frame 11, and a sprocket 57 is connected to it for driving a chain 58 which is in turn disposed about idler sprockets 58a and a sprocket 59 carried on the superstructure 16 of the frame forwardly of the subframe 17. The sprocket 59 is in turn connected to a sprocket 60 spaced outwardly therefrom and carried on a support 61, and a chain 62 connects the sprocket 60 with a sprocket 63 connected to the shaft 56.

As best shown in FIGS. 2 and 3, there is another spur gear 55 at the opposite or left end of the shaft 56 for engagment by the spur gear 54 on the upper end of the shaft 37 as the platform 18 is moved laterally from the position it occupies in overhanging the right side of the frame to a position for overhanging the left side of the frame. Since the shaft 56 is unidirectional in rotation, this shifting of the spur gear 54 from engagement with the spur gear 55 at one side to engagement with the spur gear at the other end of the shaft 56 will cause the carrier 35 to be rotated in an opposite direction. Thus, while the carrier will rotate in a clockwise direction when the platform overhangs the right side of the frame, it will rotate in a counter-clockwise direction when the platform is shifted to overhang the left side of the frame. In this manner, of course, the carrier will be operative to move the inverted windrow from its side aligned with the frame to its other side overhanging the left side of the frame for laying the inverted windrow along the ground surface to the side of the frame.

The platform is shifted between its alternate positions by means of an arm 65 which is pivotally connected at its forward end to a portion of the platform (not shown) and at its rearward end to the longitudinal center of the frame. More particularly, the rearward connection of the arm 65 to the frame is slotted at 66 to permit some lost motion as the rod is swung from the position shown in FIG. 2 to an opposite position in which it extends forwardly at an acute angle on the other side of the center of the frame in shifting the platform. The arm is so swung by means of a power cylinder 67 pivotally connected between the superstructuer of the frame and an intermediate portion of the arm.

As shown in FIGS. 1, 2, 3 and 5, a gang 68 of discs is mounted on the frame 11 behind and adjacent each side of the mechanism 25 for use in forming a mound of soil longitudinally of the ground surface over which such mechanism is moved. In this respect, it should be understood that the frame may traverse one or two planted rows of peanuts. In the event two planted rows of peanuts are traversed, the windrow which is laid to one saide of the frame will also span two "planted" rows. Thus, as previously described, the attachment of the discs 68 to the frame is useful in building up a mound of soil over the furrow between adjacent planted rows of peanuts. As will be more apparent from the description to follow, this will enable another windrow to be picked up, inverted, and laid on a mound on the ground surface next to the frame and thus out of water which might accumulate in the furrow.

Each gang 68 is arranged with the discs 69 thereof turned at an angle so as to face inwardly in a forward direction. A rod 70 on the upper end of each gang is suspended from a bar 71 which extends forwardly therefrom to a rod 72 which is pivotally mounted on the frame to permit the gang 68 to follow the contour of the ground surface G. Also, a chain 73 connects the bar 71 with a portion of the superstructure of the frame so as to permit the gangs of discs to be raised above engagement with the ground surface, either for transporting purposes or in the event the gangs are not to be used in operation of the apparatus.

As shown in the drawings, the wheels 12 engage the ground surface a fairly substantial distance rearwardly of the opening into the housing of the mechanism 25. In this manner, the wheels do not pull the windrow away from the entrance into the mechanism.

As best shown in FIGS. 1 and 2, there are two wheels 12 on each side of the frame, and the axle of each pair of wheels is supported from a beam 75 which extends downwardly and rearwardly from a pivotal connection 76 with the base of the frame. The wheels 12 are selectively raised or lowered by means of a power cylinder 77 pivotally connected to the base of the frame and having a rod 78 thereof connected by a shaft 68a rotatably mounted on the frame with a crank 79 pivotally connected with the upper edge of the beam 75 for selectively raising or lowering the wheels 12. Thus, the wheels may be lowered so as to raise the mechanism 25 above the ground surface G for transporting purposes. Then, of course, when it is desired to operate the apparatus in inverting a windrow, the wheels may be raised relative to the frame so as to lower the lower end of plate 31 into a desired position relative to the ground surface G.

As previously described, in the use of this apparatus 10 in inverting windrows of peanuts or the like the vines of the peanuts will have first been cut either between adjacent rows of peanuts or between every other row. In the illusrtated operation, wherein the apparatus is provided with gangs 68 of discs, it will be assumed that each windrow includes two planted rows of peanuts, and that the frame and mechanism 25 are of widths for spanning such a windrow. As previously described, it is also contemplated that the windrow will have been previously shaken to some extent upon being picked up and laid down on the ground surface.

With this preparation, the apparatus is moved forwardly over a windrow, which may be the window on the row B illustrated in FIGS. 7 and 8. As shown in FIG. 7, apparatus is moving in a downward direction with the platform overhanging the left side thereof so that inverted windrow picked up from row B is laid on the ground surface on row A to the left side of the downwardly moving frame.

When the apparatus has completed its traverse of row B, it will be turned around so as to be disposed for movement in an upward direction, as shown in FIG. 8, and over the windrow on row C for traversing same. The apparatus is further prepared for this traverse by shifting the platform 18 and the wheel 35a above it from a position overhanging its left side to a position overhanging its right side and thus over row B. Thus, as can be seen from FIG. 8, as the apparatus is moved in an upwardly direction to traverse row C, it will lay the inverted windrow upon row B from which the windrow was picked up during the previous traverse of row B. More particularly, and due to the fact that the soil on the ground surface from which the first windrow has been picked up is built up along the mid-portion thereof, the inverted windrow picked up from row C will be laid over such mound, rather than within a furrow between the planted rows of peanuts of row B.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for use in harvesting peanuts or like crops, comprising a frame adapted to be moved forwardly over a windrow of the crop, means on the frame for picking up and inverting the windrow for movement in a forward direction, and means on the frame for turning the inverted row to move in a rearward direction and laying it on the ground surface in its inverted position and to one side of the ground surface from which it was picked up.

2. Apparatus of the character defined in claim 1, wherein said means for turning and laying the inverted windrow to one side comprises a platform which is open to the rear at each side, one of said open sides being positioned to receive the inverted windrow, and means on the platform for carrying the inverted windrow received on said one open side of the platform to and past the other open side thereof.

3. Apparatus of the character defined in claim 2, including means for laterally shifting said platform and said means for picking up and inverting the windrow relative to one another to position said other open end of the carrier for receiving the inverted windrow, so that it may be moved to and past said one open side thereof.

4. Apparatus of the character defined in claim 1, including means for operating each of said mean independently of the forward movement of the frame.

5. Apparatus of the character defined in claim 1, including means on the frame for building up a mound of soil along the ground surface from which the windrow has been picked up.

6. Apparatus for use in harvesting peanuts or like crops, comprising a frame adapted to be moved forwardly over a windrow of the crop, means on the frame including fingers rotatable about a laterally extending axis for penetrating the top of the windrow and a plate rearwardly of the fingers and in the path of the windrow to confine the windrow for turning on itself about a generally horizontal axis so as to move in a forward direction, and means on the frame for receiving the inverted windrow and turning it about a generally vertical axis for movement in a rearward direction and laying it on the ground surface to one side of the ground surface from which it was picked up.

7. Apparatus of the character defined in claim 6, wherein the means for receiving and turning the inverted windrow comprises a platform which is open at both sides of its rearward end and has a forward wall extending thereacross from one side to the other and curved concavely with respect to its rearward end, one of said open sides being positioned to receive the inverted and forwardly moving windrow, and a wheel mounted on the platform for rotation about a generally vertical axis generally midway between the sides of the platform and having parts thereon rotatable generally concentrically within the forward wall for penetrating the top of the windrow to carry it from one open side to and off said other open side.

8. Apparatus of the character defined in claim 7 including means for laterally shifting said platform and said means for picking up and inverting the windrow relative to one another to position said other open end of the carrier for receiving the inverted windrow, so that it may be moved to and past said one open side thereof.

9. Apparatus for inverting a windrow, comprising a frame adapted to be moved forwardly over the windrow, means on the frame for picking up the windrow, inverting it, and selectively laying the inverted windrow on the ground surface to one side or the other of the ground surface from which the windrow was picked up, said means including a platform for receiving the picked up windrow on one side thereof, a carrier on the platform for turning the window about a generally vertical axis from said one side to and off the other side of the platform, and means for picking up the windrow and feeding it onto one side of the platform, and means for laterally shifting the platform and said last mentioned means with respect to one another to permit the windrow to be selectively received on said other side, whereby it may be moved to and off of said one side .

10. Apparatus of the character defined in claim 9, wherein the means for picking up and feeding the windrow is fixedly secured to the frame in substantial alignment therewith, and wherein said means for laterally shifting the platform shifts same with respect to the frame between positions in which it overhangs one side or the other of said frame.

11. Apparatus of the character defined in claim 9, including means for operating said means independently of the forward movement of the frame.

12. Apparatus of the character defined in claim 9, including means on the frame for building up a mound of soil along a mid-portion of the ground surface from which the windrow has been picked up.

13. Apparatus of the character defined in claim 12, including means for operating means for picking up the windrow, inverting it, and laying the inverted windrow on the ground surface independently of the forward movement of the frame.

References Cited

UNITED STATES PATENTS

| | | | |
|---|---|---|---|
| 98,647 | 1/1870 | Vairin | 172—579 |
| 1,338,594 | 4/1920 | Shannon | 171—6 |
| 1,590,125 | 6/1926 | Sciford | 56—356X |
| 2,390,375 | 12/1945 | Kucera | 56—370 |
| 2,391,427 | 12/1945 | Kucera | 56—370 |
| 2,667,731 | 2/1954 | Nerness | 56—372 |
| 2,669,285 | 2/1954 | Miller | 56—370 |
| 2,679,720 | 6/1954 | Cymara | 56—370 |

RUSSELL R. KINSEY, Primary Examiner